United States Patent

Skotzky

[11] Patent Number: 5,964,565
[45] Date of Patent: Oct. 12, 1999

[54] DEER LIFTING DEVICE FOR ALL TERRAIN VEHICLES

[76] Inventor: Harvey Steven Skotzky, Rte. 3 Box 201-B, Buena Vista, Ga. 31803

[21] Appl. No.: 09/065,149

[22] Filed: Apr. 23, 1998

[51] Int. Cl.[6] .................................................. B60R 9/04
[52] U.S. Cl. ........................ 414/462; 224/309; 224/319
[58] Field of Search ........................... 414/462; 224/309, 224/319, 329, 331

[56] References Cited

U.S. PATENT DOCUMENTS

| | | | |
|---|---|---|---|
| 2,492,841 | 12/1949 | Burkey. | |
| 3,352,440 | 11/1967 | Wilson. | |
| 3,866,776 | 2/1975 | Partyka | 414/462 |
| 4,063,659 | 12/1977 | Welch | 414/462 |
| 4,446,998 | 5/1984 | Taig | 414/462 X |
| 4,854,628 | 8/1989 | Halberg | 296/3 |
| 5,393,194 | 2/1995 | Smith | 414/546 |
| 5,440,773 | 8/1995 | Lentini | 14/69.5 |

FOREIGN PATENT DOCUMENTS

WO 92/20965 11/1992 WIPO.
WO 94/27546 12/1994 WIPO.

*Primary Examiner*—Janice L. Krizek

[57] ABSTRACT

A new deer lifting device for all terrain vehicles for allowing a deer to be lifted in an easier manner. The inventive device includes a pair of clamps adapted for coupling with a cargo rack of an all terrain vehicle. A forward section extends rearwardly from the pair of clamps. A middle section extends rearwardly from the forward section. The middle section includes a pair of support posts extending upwardly therefrom. A back section extends downwardly from the middle section.

7 Claims, 3 Drawing Sheets

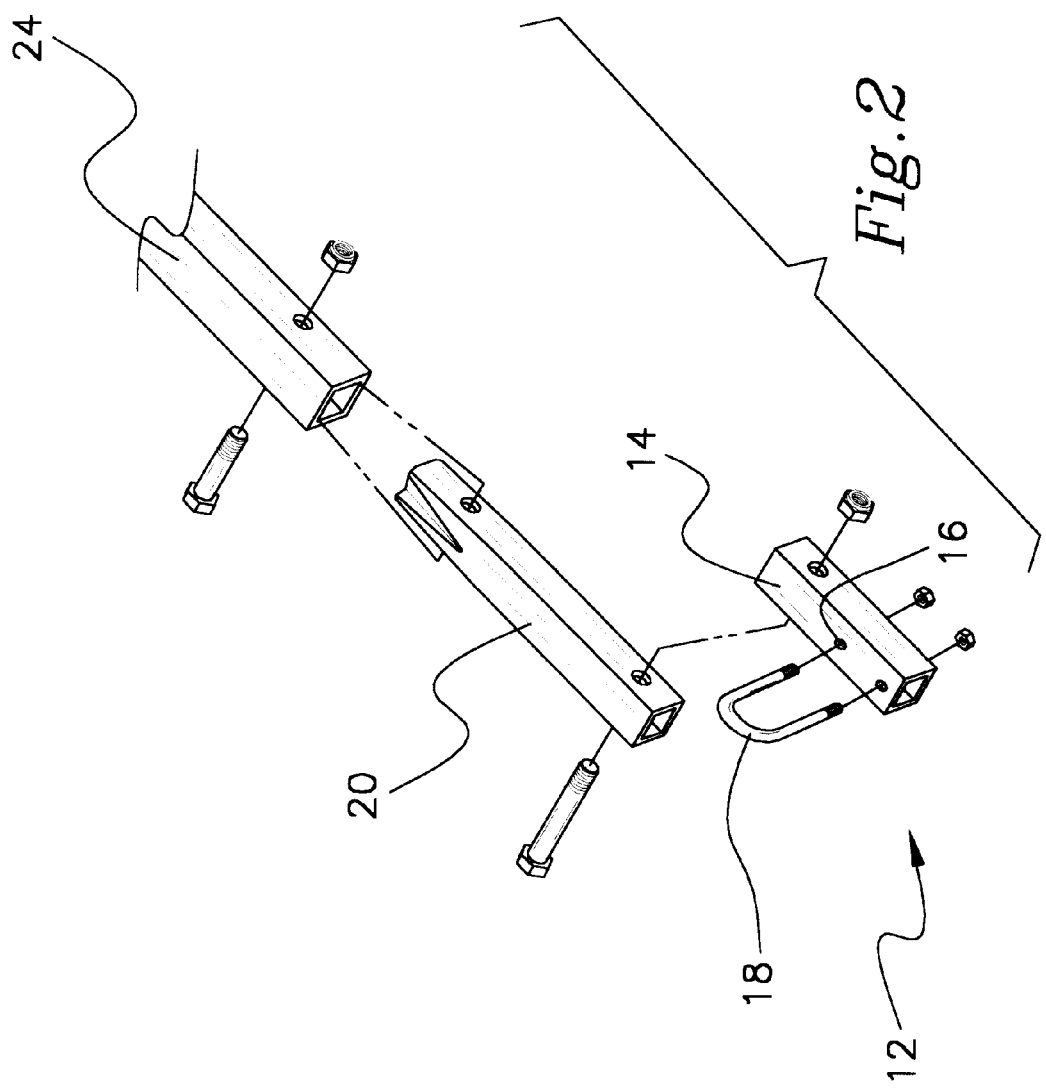

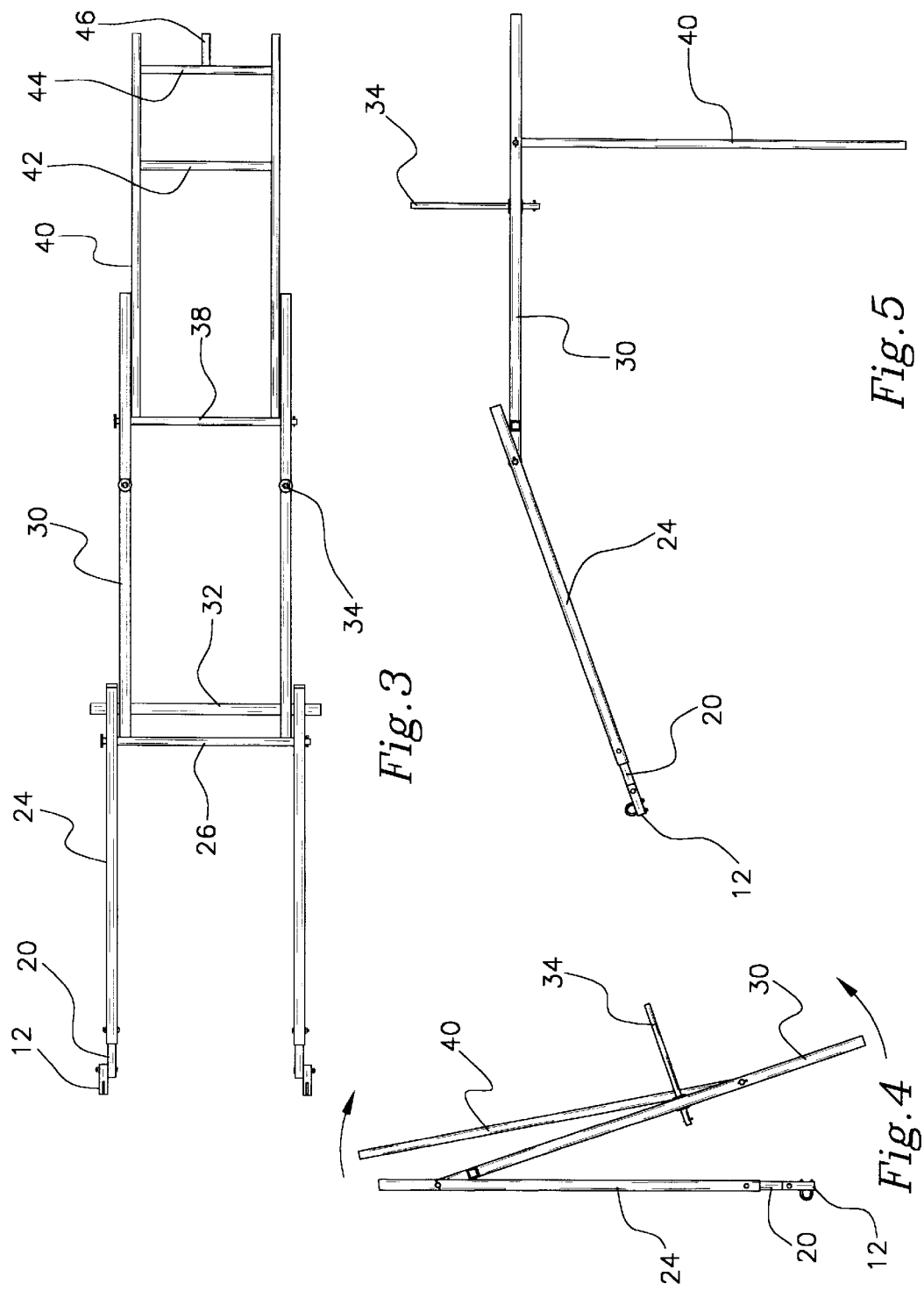

DEER LIFTING DEVICE FOR ALL TERRAIN VEHICLES

BACKGROUND OF THE INVENTION

1. Field of the Invention

The present invention relates to game animal carriers and more particularly pertains to a new deer lifting device for all terrain vehicles for allowing a deer to be lifted in an easier manner.

2. Description of the Prior Art

The use of game animal carriers is known in the prior art. More specifically, game animal carriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art game animal carriers include U. S. Pat. No. 5,393,194 to Smith; U.S. Pat. No. 2,492,841 to Burkey; Patent No. WO 94/27546 to Fretwell et al.; U.S. Pat. No. 3,352,440 to Wilson; U.S. Pat. No. 5,440,773 to Lentini; U.S. Pat. No. 4,854,628 to Halberg; and WO 92/20965 to Boyd.

While these devices fulfill their respective, particular objectives and requirements, the aforementioned patents do not disclose a new deer lifting device for all terrain vehicles. The inventive device includes a pair of clamps adapted for coupling with a cargo rack of an all terrain vehicle. A forward section extends rearwardly from the pair of clamps. A middle section extends rearwardly from the forward section. The middle section includes a pair of support posts extending upwardly therefrom. A back section extends downwardly from the middle section.

In these respects, the deer lifting device for all terrain vehicles according to the present invention substantially departs from the conventional concepts and designs of the prior art, and in so doing provides an apparatus primarily developed for the purpose of allowing a deer to be lifted in an easier manner.

SUMMARY OF THE INVENTION

In view of the foregoing disadvantages inherent in the known types of game animal carriers now present in the prior art, the present invention provides a new deer lifting device for all terrain vehicles construction wherein the same can be utilized for allowing a deer to be lifted in an easier manner.

The general purpose of the present invention, which will be described subsequently in greater detail, is to provide a new deer lifting device for all terrain vehicles apparatus and method which has many of the advantages of the game animal carriers mentioned heretofore and many novel features that result in a new deer lifting device for all terrain vehicles which is not anticipated, rendered obvious, suggested, or even implied by any of the prior art game animal carriers, either alone or in any combination thereof.

To attain this, the present invention generally comprises a pair of clamps adapted for coupling with a cargo rack of an all terrain vehicle. The pair clamps each include a section of square tubing. The square tubing has a pair of apertures therethrough. The pair of apertures receive free ends of an inverted U-shaped ring therethrough. The inverted U-shaped ring engages the cargo rack of the all terrain vehicle. The pair of clamps include a pair of supplemental tubes secured to and extending rearwardly from the section of square tubing. The supplement tubes have tapered free ends. A forward section extends rearwardly from the pair of clamps. The forward section includes a pair of elongated members. The elongated members have open inner ends for receiving the tapered free ends of the supplemental tubes therein. The pair of elongated members have a cross member extending therebetween inwardly of outer ends thereof. A middle section extends rearwardly from the forward section. The middle section includes a pair of elongated members. Inner ends of the elongated members of the middle section are pivotally coupled with the outer ends of the elongated members of the forward section. The elongated members of the middle section have a forward cross member extending therebetween outwardly of the inner ends thereof. The middle section includes a pair of support posts extending upwardly from the elongated members thereof. A back section extends downwardly from the middle section. The back section includes an upper cross member rotatably positioned between the elongated members of the middle section. The upper cross member has a pair of vertical members extending downwardly therefrom. The pair of vertical members include an intermediate cross member and a lower cross member extending therebetween. The lower cross member has a central leg extending downwardly therefrom to a level equal to lower ends of the vertical members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new deer lifting device for all terrain vehicles apparatus and method which has many of the advantages of the game animal carriers mentioned heretofore and many novel features that result in a new deer lifting device for all terrain vehicles which is not anticipated, rendered obvious, suggested, or even implied by any of the prior art game animal carriers, either alone or in any combination thereof.

It is another object of the present invention to provide a new deer lifting device for all terrain vehicles which may be easily and efficiently manufactured and marketed.

It is a further object of the present invention to provide a new deer lifting device for all terrain vehicles which is of a durable and reliable construction.

An even further object of the present invention is to provide a new deer lifting device for all terrain vehicles which is susceptible of a low cost of manufacture with regard to both materials and labor, and which accordingly is then susceptible of low prices of sale to the consuming public, thereby making such deer lifting device for all terrain vehicles economically available to the buying public.

Still yet another object of the present invention is to provide a new deer lifting device for all terrain vehicles which provides in the apparatuses and methods of the prior art some of the advantages thereof, while simultaneously overcoming some of the disadvantages normally associated therewith.

Still another object of the present invention is to provide a new deer lifting device for all terrain vehicles for allowing a deer to be lifted in an easier manner.

Yet another object of the present invention is to provide a new deer lifting device for all terrain vehicles which includes a pair of clamps adapted for coupling with a cargo rack of an all terrain vehicle. A forward section extends rearwardly from the pair of clamps. A middle section extends rearwardly from the forward section. The middle section includes a pair of support posts extending upwardly therefrom. A back section extends downwardly from the middle section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the ATV attachment clamps of the present invention.

FIG. 3 is a top plan view of the present invention.

FIG. 4 is a side view of the present invention illustrated in a folded orientation.

FIG. 5 is a side view of the present invention.

DESCRIPTION OF THE PREFERRED EMBODIMENT

Figure 1:
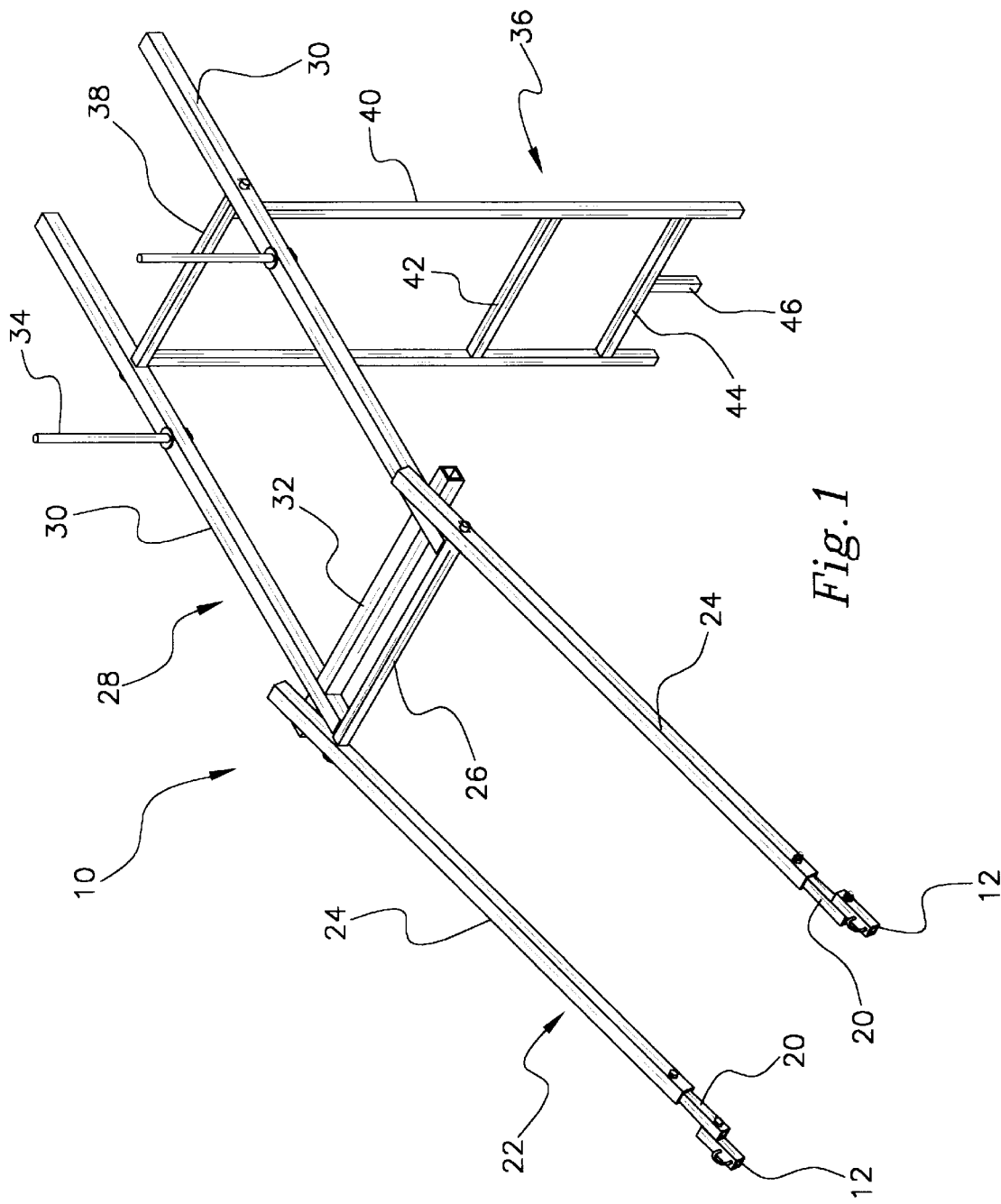
FIG. 1 is a perspective view of a new deer lifting device for all terrain vehicles according to the present invention.

With reference now to the drawings, and in particular to FIGS. 1 through 5 thereof, a new deer lifting device for all terrain vehicles embodying the principles and concepts of the present invention and generally designated by the reference numeral 10 will be described.

As best illustrated in FIGS. 1 through 5, the deer lifting device for all terrain vehicles 10 comprises a pair of clamps 12 adapted for coupling with a cargo rack of an all terrain vehicle. The pair of clamps 12 each include a section of square tubing 14. The square tubing 14 has a pair of apertures 16 therethrough. The pair of apertures 16 receive free ends of an inverted U-shaped ring 18 therethrough. The inverted U-shaped ring 18 engages the cargo rack of the all terrain vehicle. The pair of clamps 12 include a pair of supplemental tubes 20 secured to and extending rearwardly from the section of square tubing 14. The supplemental tubes 20 have tapered free ends.

A forward section 22 extends rearwardly from the pair of clamps 12. The forward section 22 includes a pair of elongated members 24. The elongated members 24 have open inner ends for receiving the tapered free ends of the supplemental tubes 20 therein. The pair of elongated members 24 have a cross member 26 extending therebetween inwardly of outer ends thereof.

A middle section 28 extends rearwardly from the forward section 22. The middle section 28 includes a pair of elongated members 30. Inner ends of the elongated members 30 of the middle section 28 are pivotally coupled with the outer ends of the elongated members 24 of the forward section 22. The elongated members 30 of the middle section 28 have a forward cross member 32 extending therebetween outwardly of the inner ends thereof. The middle section 28 includes a pair of support posts 34 extending upwardly from the elongated members 30 thereof.

A back section 36 extends downwardly from the middle section 28. The back section 36 includes an upper cross member 38 rotatably positioned between the elongated members 30 of the middle section 28. The upper cross member 38 has a pair of vertical members 40 extending downwardly therefrom. The pair of vertical members 40 include an intermediate cross member 42 and a lower cross member 44 extending therebetween. The lower cross member 44 has a central leg 46 extending downwardly therefrom to a level equal to lower ends of the vertical members 40.

In use, a hunter would attach the clamps 12 to the cargo rack on the all terrain vehicle, slide the elongated members 24 of the forward section 22 over the supplemental tubes 20. To carry the device 10, the back section 36 would be folded up under the middle section 28 and the middle section 28 would be pushed inwardly so that the device 10 folds and forms an inverted "V". The support posts 34 attached to the middle section 28 would hold the device 10 in position and a strap that is connected to the cargo rack would be attached to the device 10 to hold it in position while the all terrain vehicle is moving. If the hunter harvests a deer or other game animal, he would release the strap so that the device 10 could be folded outward. When the device 10 is unfolded, it would form a ramp from the ground up to the cargo rack on the all terrain vehicle. The hunter would lift the deer up and place it on the middle section 28 in front of the support posts 34. From this position, the hunter could slide the deer up the ramp and onto the cargo rack. After the deer is loaded, the hunter would fold the device 10 up, use the strap to secure the device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deer lifting device for all terrain vehicles for allowing a deer to be lifted in an easier manner comprising, in combination:

a pair of clamps adapted for coupling with a cargo rack of an all terrain vehicle, the pair of clamps each including a section of square tubing, the square tubing having a pair of apertures therethrough, the pair of apertures receiving free ends of an inverted U-shaped ring therethrough, the inverted U-shaped ring engaging the cargo rack of the all terrain vehicle, the pair of clamps including a pair of supplemental tubes secured to and extending rearwardly from respective ones of the sections of square tubing, the supplemental tubes having tapered free ends;

a forward section extending rearwardly from the pair of clamps, the forward section including a pair of elongated members, the elongated members having open inner ends for receiving the tapered free ends of the supplemental tubes therein, the pair of elongated members having a cross member extending therebetween inwardly of outer ends thereof;

a middle section extending rearwardly from the forward section, the middle section including a pair of elongated members, inner ends of the elongated members of the middle section pivotally coupled with the outer ends of the elongated members of the forward section, the elongated members of the middle section having a forward cross member extending therebetween outwardly of the inner ends thereof, the middle section including a pair of support posts extending upwardly from the elongated members thereof;

a back section extending downwardly from the middle section, the back section including an upper cross member rotatably positioned between the elongated members of the middle section, the upper cross member having a pair of vertical members extending downwardly therefrom, the pair of vertical members including an intermediate cross member and a lower cross member extending therebetween, the lower cross member having a central leg extending downwardly therefrom to a plane extending across lower ends of the vertical members.

2. A deer lifting device for all terrain vehicles, comprising:

a pair of clamps adapted for coupling with a cargo rack of an all terrain vehicle;

a forward section extending rearwardly from the pair of clamps;

a middle section extending rearwardly from the forward sections, the middle section including a pair of support posts extending upwardly therefrom;

a back section extending downwardly from the middle section; and wherein the pair of clamps each include a section of tubing, the tubing having a pair of apertures therethrough, the pair of apertures receiving free ends of an inverted U-shaped ring therethrough, the inverted U-shaped ring engaging the cargo rack of the all terrain vehicle, the pair of clamps including a pair of supplemental tubes secured to and extending rearwardly from respective ones of the sections of tubing, the supplemental tubes having tapered free ends.

3. The deer lifting device for all terrain vehicles as set forth in claim 2 wherein the forward section includes a pair of elongated members, the elongated members having open inner ends for receiving the tapered free ends of the supplemental tubes therein, the pair of elongated members having a cross member extending therebetween inwardly of outer ends thereof.

4. The deer lifting device for all terrain vehicles as set forth in claim 3, wherein the middle section includes a pair of elongated members, inner ends of the elongated members of the middle section pivotally coupled with the outer ends of the elongated members of the forward section, the elongated members of the middle section having a forward cross member extending therebetween outwardly of the inner ends thereof, the pair of support posts extends upwardly from the elongated members thereof.

5. The deer lifting device for all terrain vehicles as set forth in claim 4 wherein the back section includes an upper cross member rotatably positioned between the elongated members of the middle section, the upper cross member having a pair of vertical members extending downwardly therefrom, the pair of vertical members including an intermediate cross member and a lower cross member extending therebetween, the lower cross member having a central leg extending downwardly therefrom to a plane extending across lower ends of the vertical members.

6. The deer lifting device for all terrain vehicles as set forth in claim 3, wherein the middle section includes a pair of elongated members, inner ends of the elongated members of the middle section pivotally coupled with the outer ends of the elongated members of the forward section, the elongated members of the middle section having a forward cross member extending therebetween outwardly of the inner ends thereof, the pair of support posts extends upwardly from the elongated members thereof.

7. The deer lifting device for all terrain vehicles as set forth in claim 4 wherein the back section includes an upper cross member rotatably positioned between the elongated members of the middle section, the upper cross member having a pair of vertical members extending downwardly therefrom, the pair of vertical members including an intermediate cross member and a lower cross member extending therebetween, the lower cross member having a central leg extending downwardly therefrom to a plane extending across lower ends of the vertical members.

* * * * *